(12) United States Patent
Shao (10) Patent No.: US 11,603,922 B2
(45) Date of Patent: Mar. 14, 2023

(54) TRANSMISSION DEVICE FOR HOUSEHOLD ELECTRICAL APPLIANCE

(71) Applicant: Gexin Han, Beijing (CN)

(72) Inventor: Libo Shao, Jiangsu (CN)

(73) Assignee: Gexin Han, Beijing (CN)

( * ) Notice: Subject to any disclaimer, the term of this patent is extended or adjusted under 35 U.S.C. 154(b) by 0 days.

(21) Appl. No.: 17/378,611

(22) Filed: Jul. 16, 2021

(65) Prior Publication Data

US 2021/0341052 A1 Nov. 4, 2021

Related U.S. Application Data (63) Continuation of application No. PCT/CN2020/072441, filed on Jan. 16, 2020.

(30) Foreign Application Priority Data

Jan. 16, 2019 (CN) .......................... 201920088278.7
Jan. 28, 2019 (CN) .......................... 201920148815.2

(51) Int. Cl.
*F16H 57/08* (2006.01)
*F16H 1/32* (2006.01)
(Continued)

(52) U.S. Cl.
CPC ............. *F16H 57/082* (2013.01); *F16H 1/32* (2013.01); *F16H 57/021* (2013.01);
(Continued)

(58) Field of Classification Search
CPC ........ F16H 57/082; F16H 1/32; F16H 57/021; F16H 57/031; F16H 2001/327;
(Continued)

(56) References Cited

U.S. PATENT DOCUMENTS 4,392,396 A * 7/1983 Sato ...................... F16H 37/041
74/411
4,471,671 A * 9/1984 Sigg ........................ B02C 15/14
475/346

(Continued)

FOREIGN PATENT DOCUMENTS

CN 101358417 A 2/2009
CN 201762573 U 3/2011
(Continued)

OTHER PUBLICATIONS

Gexin Han, International Search Report and English Translation, PCT/CN2020/072441, dated Apr. 22, 2020, 6 pgs.
(Continued)

*Primary Examiner* — Sherry L Estremsky
(74) *Attorney, Agent, or Firm* — USCH Law, PC (57) ABSTRACT

The present disclosure provides a transmission device for a household electrical appliance, including a drive shaft and an output shaft assembly. The output shaft assembly includes a planetary carrier, a planetary gear train mounted on the planetary carrier, an output shaft and a follower shaft. The planetary gear train includes a sun gear and at least one planetary gear engaged with the sun gear. The planetary carrier is connected to the output shaft. The sun gear is connected to the follower shaft. The planetary carrier is provided with a first bearing and a second bearing that are disposed coaxially with the output shaft. One end of the follower shaft protrudes from the sun gear and is connected to the first bearing. One other end of the follower shaft passes through the second bearing, protrudes from the planetary carrier and is connected to the drive shaft in a clearance fit.

3 Claims, 5 Drawing Sheets

(51) Int. Cl.
*F16H 57/021* (2012.01)
*F16H 57/031* (2012.01)

(52) U.S. Cl.
CPC ..... *F16H 57/031* (2013.01); *F16H 2001/327* (2013.01); *F16H 2057/085* (2013.01)

(58) Field of Classification Search
CPC ...... F16H 2057/085; F16H 57/08; F16H 1/48; F16H 1/28; F16H 1/2845
See application file for complete search history.

(56) References Cited

U.S. PATENT DOCUMENTS

| | | | | |
|---|---|---|---|---|
| 5,370,014 | A * | 12/1994 | Pigozzi | F16H 37/042 |
| | | | | 74/606 R |
| 6,000,651 | A * | 12/1999 | Zibret | A47J 43/085 |
| | | | | 241/300 |
| 6,255,751 | B1 * | 7/2001 | Hoffmann | H02K 11/21 |
| | | | | 310/40 MM |
| 10,823,262 | B2 * | 11/2020 | Brunner | F16H 13/06 |
| 2016/0130739 | A1 * | 5/2016 | Song | D06F 37/40 |
| | | | | 68/133 |
| 2017/0002499 | A1 | 1/2017 | Lv et al. | |
| 2017/0096765 | A1 * | 4/2017 | Yu | D06F 37/40 |
| 2018/0338643 | A1 | 11/2018 | Hammond et al. | |

FOREIGN PATENT DOCUMENTS

| | | | | |
|---|---|---|---|---|
| CN | 203383030 | U | 1/2014 | |
| DE | 102008045848 | A1 * | 3/2010 | F16H 1/48 |
| DE | 102012206162 | A1 | 10/2013 | |
| DE | 102018209834 | A1 * | 12/2019 | |
| EP | 0130971 | A1 * | 1/1985 | |
| KR | 100247762 | B1 | 3/2000 | |
| WO | WO-2017061833 | A1 * | 4/2017 | D06F 17/08 |
| WO | WO 2018/166397 | A1 | 9/2018 | |

OTHER PUBLICATIONS

Han, Gexin, European Extended Search Report, EP 20741002.8, dated Feb. 9, 2022, 11 pgs.

* cited by examiner

TRANSMISSION DEVICE FOR HOUSEHOLD ELECTRICAL APPLIANCE

CROSS REFERENCE TO RELATED APPLICATIONS

The present application is a continuation of PCT Application No. PCT/CN2020/072441, entitled "TRANSMISSION DEVICE FOR HOUSEHOLD ELECTRICAL APPLIANCE", filed Jan. 16, 2020, which claims priorities to Chinese patent application No. 201920088278.7, entitled "TRANSMISSION DEVICE FOR WASHING MACHINE," filed Jan. 16, 2019, and Chinese patent application No. 201920148815.2, entitled "TRANSMISSION DEVICE FOR HOUSEHOLD ELECTRICAL APPLIANCE," filed Jan. 28, 2019. Each of the above-referenced applications is incorporated by reference herein in its entirety.

TECHNICAL FIELD

The present disclosure relates to the field of mechanical technology, in particular to a transmission device for a household electrical appliance.

BACKGROUND

An electrical appliance is usually driven by a motor. For example, the electrical appliance (such as a cooking machine) is usually provided with a miniature motor which drives a respective functional mechanism to perform a predetermined function. However, since an output speed of the motor is constant, while different speeds may be required to perform the predetermined function, a variator is provided between the motor and the functional mechanism. The variator is designed to have its output shaft precisely coaxial with a rotating shaft of the motor. Otherwise, the output shaft of the variator may swing in a radial direction, resulting in excessively large working noise of the electrical appliance, and severe abrasion of several transmission parts due to uneven force, and thus affecting safety and service life of the product.

SUMMARY

The present disclosure aims to provide a transmission device for household electrical appliance for solving the problem of radial swing of an output shaft due to uncoaxiality between the drive shaft and the output shaft.

Embodiments of the present disclosure provide a transmission device for a household electrical appliance, including a drive shaft and an output shaft assembly. The output shaft assembly includes a planetary carrier, a planetary gear train mounted on the planetary carrier, an output shaft and a follower shaft. The planetary gear train includes a sun gear and at least one planetary gear engaged with the sun gear. The planetary carrier is connected to the output shaft. The sun gear is connected to the follower shaft. The planetary carrier is provided with a first bearing and a second bearing that are disposed coaxially with the output shaft. One end of the follower shaft protrudes from the sun gear and is connected to the first bearing. One other end of the follower shaft passes through the second bearing, protrudes from the planetary carrier and is connected to the drive shaft in a clearance fit.

In an embodiment, the planetary carrier includes a carrier body and a carrier cover. The output shaft is disposed at one end of the carrier body. The carrier body is provided with a first recess recessed from an inner surface of carrier body. A first bearing is provided within the first recess.

In an embodiment, the carrier cover is provided with a second recess recessed from an inner surface of the carrier cover adjacent to the sun gear. A second bearing is provided within the second recess.

In an embodiment, the other end of the follower shaft is provided with a spline, and one end of the follower shaft is provided with a spline. The transmission device further includes a flexible connection-retaining sleeve provided with a key groove matched with the spline of the follower shaft and the spline of the drive shaft. The follower shaft and the drive shaft are connected through the flexible connection-retaining sleeve.

Embodiments of the present disclosure further provide a transmission device for a household electrical appliance, including an output shaft assembly. The output shaft assembly includes a planetary carrier, a planetary gear train mounted on the planetary carrier, an output shaft and an adapter shaft. The planetary gear train includes a sun gear and at least one planetary gear that are engaged with each other in sequence. The planetary carrier is connected to the output shaft. The sun gear is connected to the adapter shaft. One end of the adapter shaft protrudes from the sun gear and is rotatably connected to the planetary carrier.

In an embodiment, the planetary carrier includes a carrier body and a carrier cover. The planetary gear is mounted on the carrier body. The carrier cover is fixed to the carrier body.

In an embodiment, the output shaft is disposed at one end of the carrier body. The carrier body is provided with a recess recessed from an inner surface of the carrier body. A bearing is provided within the recess. The end of the adapter shaft protrudes from the sun gear is connected to the bearing.

In an embodiment, the planetary carrier is provided with a through hole. One end of the output shaft is inserted into the through hole from one end of the through hole and fixed therein, and the recess is provided at one other end of the through hole and is disposed coaxially with the through hole.

In an embodiment, the transmission device further includes an input shaft connected to the adapter shaft.

In the present disclosure, since the planetary carrier is provided with the first bearing and the second bearing which are coaxially disposed with the output shaft, and the other end of the follower shaft is connected with the drive shaft in a clearance fit, it is possible to avoid the radial swing of the output shaft. Meanwhile, the planetary carrier, the planetary gear train, the output shaft and the adapter shaft are all arranged in the output shaft assembly, and the end of the adapter shaft protrudes from the sun gear and is rotationally connected with the planetary carrier, thereby facilitating control of the coaxiality between the sun gear and the output shaft without requiring improvement of dimensional accuracy of other elements for this purpose, and thus effectively solving the problem that the coaxiality of the input shaft and the output shaft cannot be guaranteed.

DETAILED DESCRIPTION

Figure 1:
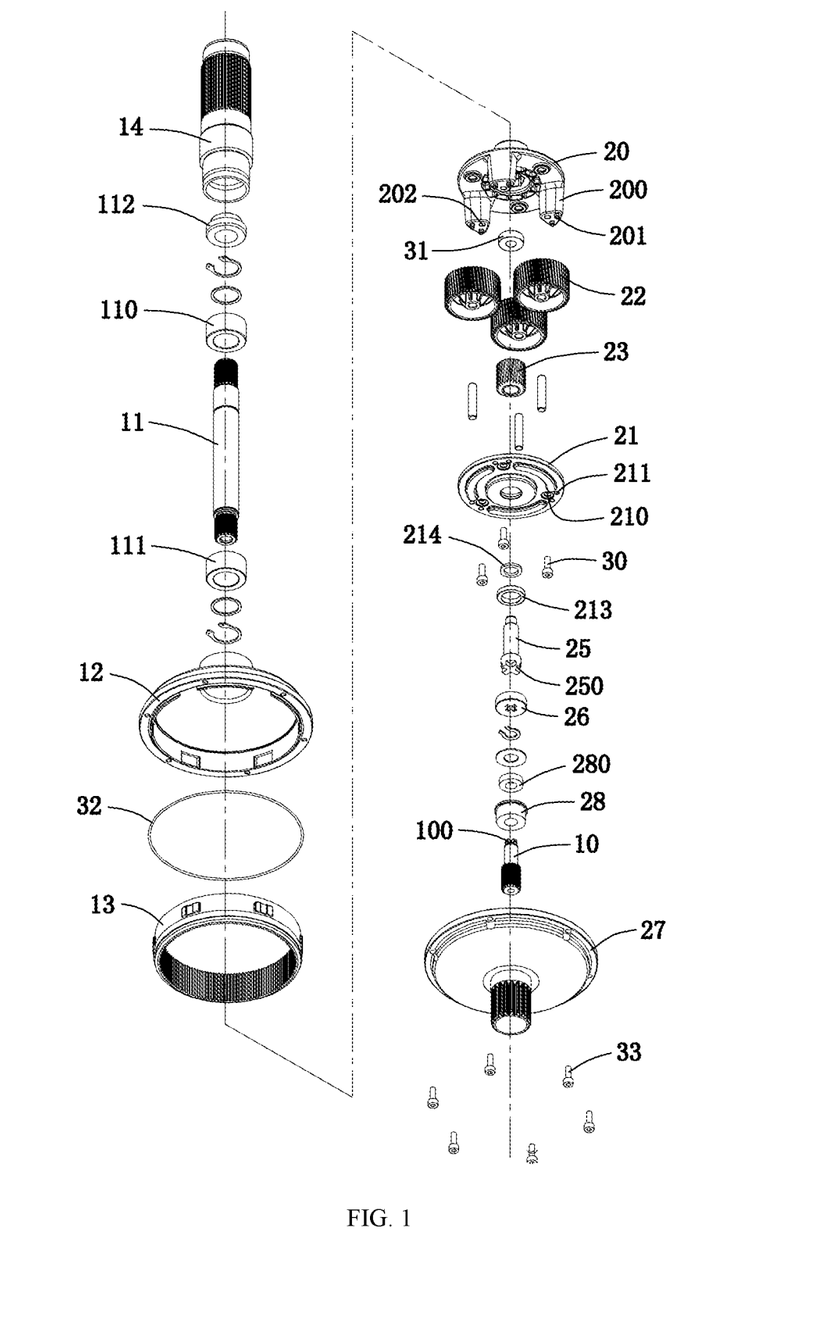
FIG. 1 is an exploded view of a transmission device for a household electrical appliance according to a first embodiment of the present disclosure.
Figure 2:
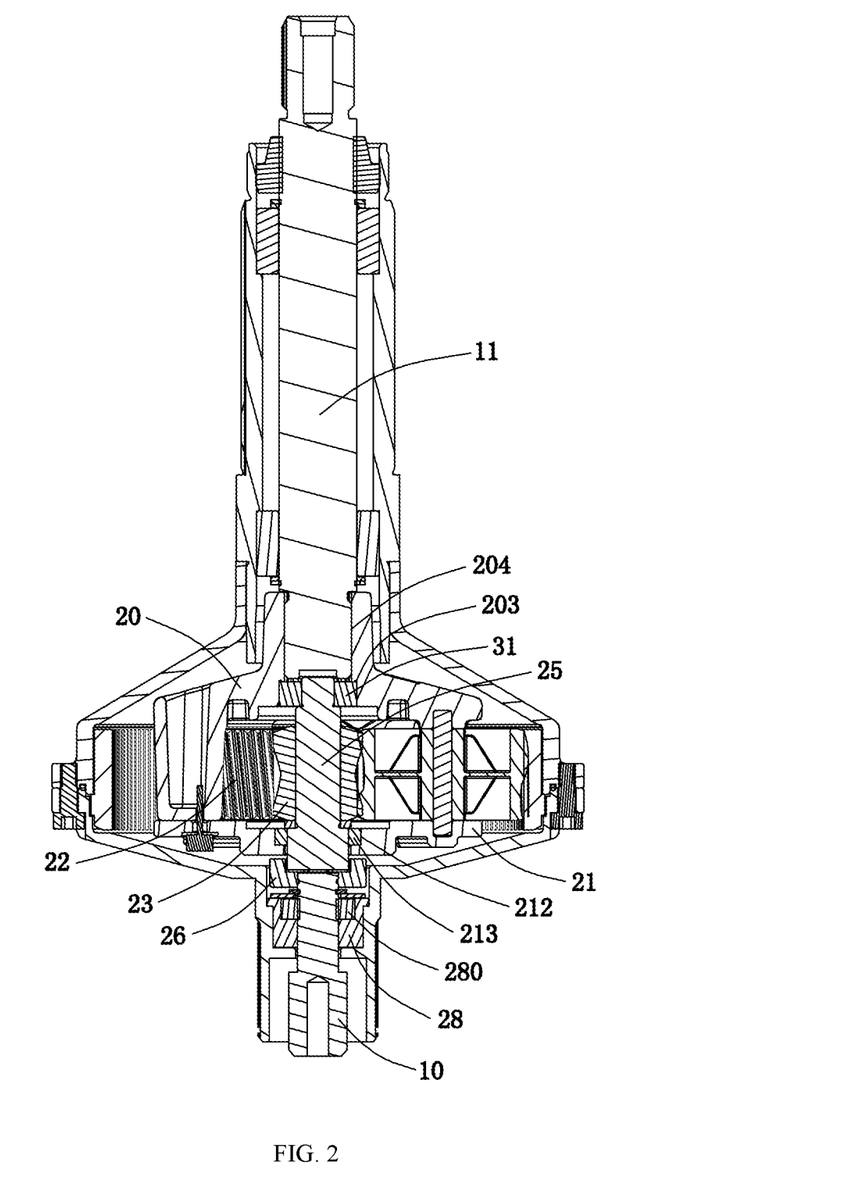
FIG. 2 is a sectional view of the transmission device for a household electrical appliance according to the first embodiment of the present disclosure.
Figure 3:
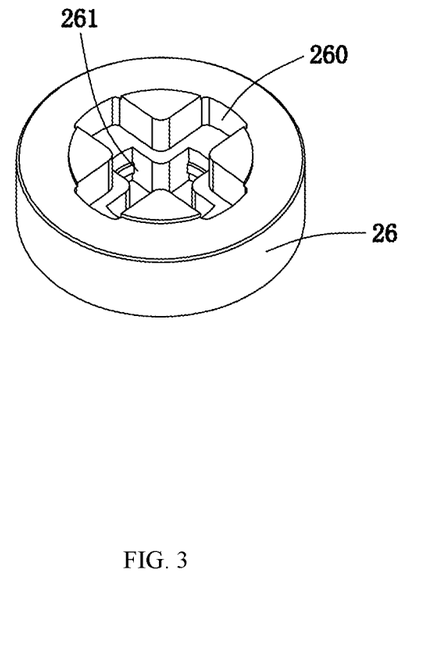
FIG. 3 is a perspective view of a flexible connection-retaining sleeve shown in FIG. 1.

Referring to FIGS. 1 to 3, a transmission device for a household electrical appliance is provided according to a first embodiment of the present disclosure. The transmission device includes a drive shaft 10 and an output shaft assembly connected to the drive shaft 10. The output shaft assembly includes a planetary carrier, a planetary gear train mounted on the planetary carrier, an output shaft 11, and a follower shaft 25. The planetary gear train includes a sun gear 23 and at least one planetary gear 22 that are engaged with each other in sequence. The planetary carrier is connected to the output shaft 11. The sun gear 23 is connected to the follower shaft 25 which is in turn connected to the drive shaft 10.

The planetary carrier includes a carrier body 20 and a carrier cover 21. The least one planetary gear 22 is mounted on the carrier body 20. The carrier cover 21 and the carrier body 20 are connected by a fastener. In the present embodiment, the fastener may be a first bolt 30. The carrier body 20 is provided with at least one support arm 200 protruding therefrom. Each support arm 200 is provided with a positioning post 201 protruding from a surface of the support arm 200, and further defines a screw hole 202 on the surface of the support arm 200. The carrier cover defines a positioning hole 211 and a through hole 210. The first bolt 30 passes through the through hole 210 of the carrier cover 21 and is locked and fixed in the screw hole 202 of the support arm 200. Alternatively, in another example, the fastener may be a column. The planetary carrier is provided with at least one support arm protruding therefrom. Each support arm is provided with a positioning post protruding from a surface of the support arm, and further defines a receiving hole (not shown) on the surface of the support arm. The carrier cover defines a positioning hole and a through hole. The column passes through the through hole of the carrier cover, and has one end received in the receiving hole of the support arm and one other end fixed to the carrier cover by welding or the like. Alternatively, a boss (not shown) may be provided on a periphery of the through hole of the carrier cover. After the column passes through the through hole of the carrier cover and is received in the receiving hole of the support arm, an edge of the boss is deformed towards the column to fix the column.

In an example, one end of the follower shaft 25 protrudes from the sun gear 23 and is rotatably connected to the carrier body 20. In an example, the output shaft 11 is disposed at one end of the carrier body 20. The carrier body 20 is provided with a first recess 203 recessed from an inner surface of carrier body 20. A first bearing 31 is provided within the first recess 203. The end of the follower shaft 25 protruding from the sun gear 23 is connected to the first bearing 31. In an example, the carrier body 20 defines a through hole 204, one end of the output shaft 11 is inserted into the through hole 24 from one end of the through hole 204 and fixed therein (e.g., by splines or the like). The first recess 203 is provided at one other end of the through hole 204 and is disposed coaxially with the through hole 204. Alternatively, the carrier body 20 and the output shaft 11 may be integrally formed.

In an example, the carrier cover 21 is provided with a second recess 212 recessed from an inner surface of the carrier cover 21 adjacent to the sun gear 23. A second bearing 213 is provided within the second recess 212. The follower shaft 25 is provided with a stop ring 214 disposed between the sun gear 23 and the second bearing 213 to prevent axial movement of the sun gear 23.

As shown in FIG. 1, one other end of the follower shaft 25 is provided with a cross spline 250, and one end of the drive shaft 10 is provided with a cross spline 100. The transmission device further includes a flexible connection-retaining sleeve 26 provided with key grooves 260 and 261 for mating with the cross spline 250 of the follower shaft and the cross spline 100 of the drive shaft, respectively, as shown in FIG. 3. The follower shaft and the drive shaft are connected through the flexible connection-retaining sleeve 26. By means of the splines and the key grooves structure, errors between the follower shaft and the drive shaft in both an axial direction and a radial direction can be compensated. By fixing of the first bearing 31 and the second bearing 213, the follower shaft and the output shaft are precisely coaxial with each other, so that the errors between the follower shaft and the drive shaft may not be transmitted to the output shaft, thereby avoiding radial swing of the output shaft.

In an example, the transmission device further includes an outer gear ring 13 and an output shaft cover 12. The outer gear ring 13 is disposed inside the output shaft cover 12 and engages with the planetary gear 22. The output shaft cover 12 is connected to an output shaft sleeve 14.

In an example, the transmission device further includes a drive shaft cover 27 in which the drive shaft 10 is received. A bearing 28 is further provided on a periphery of the drive shaft 10. A first seal 280 is provided at one end of the bearing 28 adjacent to the flexible connection-retaining sleeve 26 to prevent lubricating oil leakage. A Belleville spring and a stop ring (not indicated with numeral references) are provided between the seal 280 and the flexible connection-retaining sleeve 26 to prevent axial movement of the bearing 28. In addition, the drive shaft cover 27 and the output shaft cover 12 are connected and fixed by a fastener, for example, a second bolt 33. Further, a seal ring 32 is provided between the drive shaft cover 27 and the output shaft cover 12 to prevent leakage of lubricating oil added to the planetary gear train.

In an example, a third bearing 110 and a fourth bearing 111 are provided between the output shaft 11 and the output shaft sleeve 14. Each of the third bearing 110 and the fourth bearing 111 is provided with a respective Belleville spring and a respective stop ring (not indicated with numeral references). A second seal 112 is also provided between the output shaft 11 and one end of the output shaft sleeve 14. The Belleville spring, the stop ring and the seal has been widely used in the mechanical field, and fundamental functions of them will not be described in detail herein. In on example, the bearing may be an oil bearing or a ball bearing.

Figure 4:
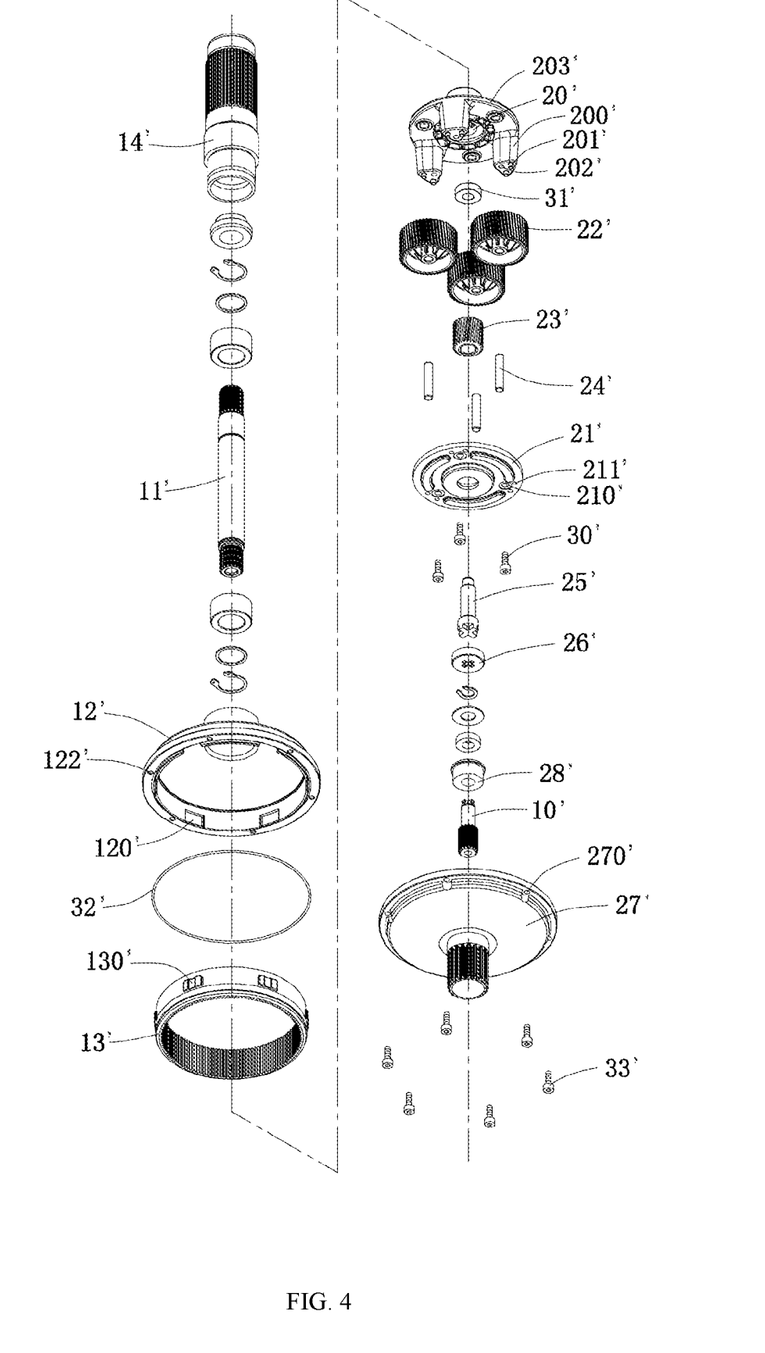
FIG. 4 is an exploded view of a transmission device for a household electrical appliance according to a second embodiment of the present disclosure.
Figure 5:
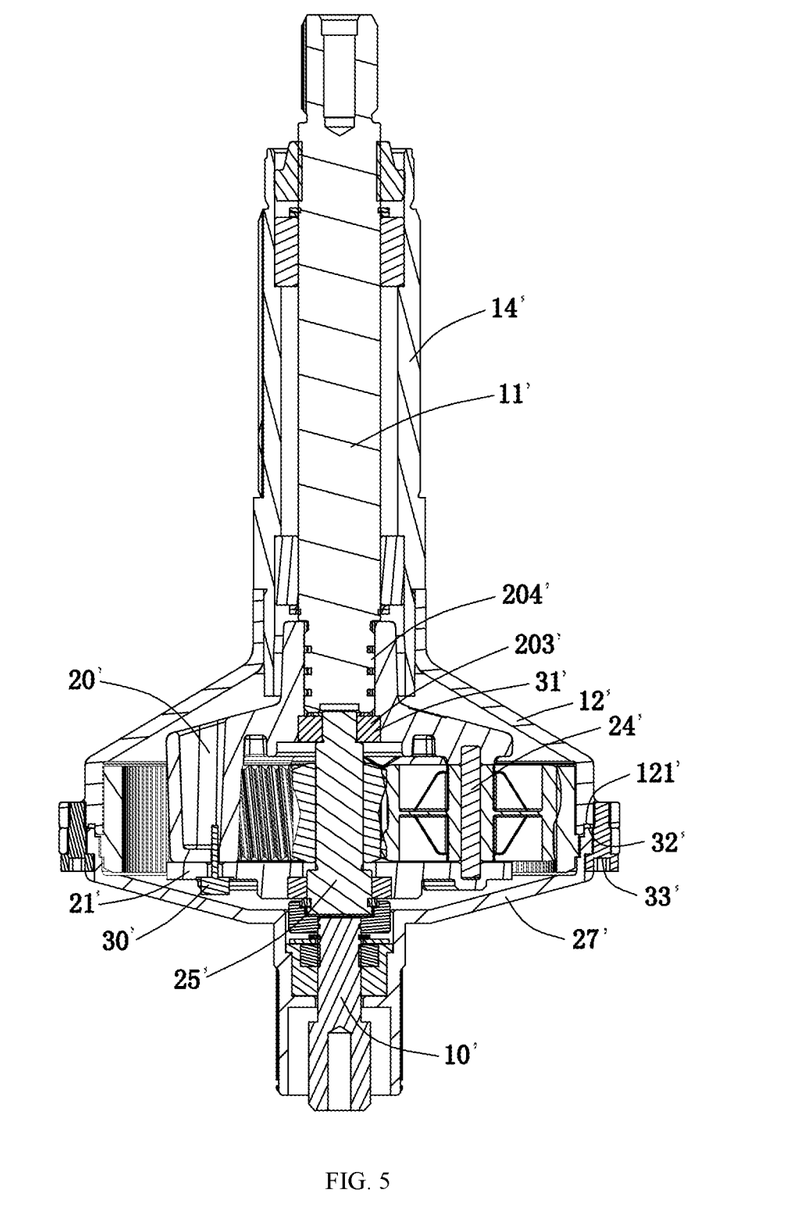
FIG. 5 is a sectional view of the transmission device for a household electrical appliance according to the second embodiment of the present disclosure.

FIGS. 4 and 5 show schematic diagrams of a second embodiment of the present disclosure. A transmission device for a household electrical appliance is provided according to a second embodiment of the present disclosure. The transmission device includes an input shaft 10' and an output shaft assembly connected to the input shaft 10'. The output shaft assembly includes a planetary carrier, a planetary gear train mounted on the planetary carrier, an output shaft 11', and a adapter shaft 25'. The planetary gear train includes a sun gear 23' and at least one planetary gear 22' that are engaged with each other. The planetary carrier is connected to the output shaft 11'. The sun gear 23' is connected to the adapter shaft 25' which is in turn connected to the input shaft 10'.

The planetary carrier includes a carrier body 20' and a carrier cover 21'. The least one planetary gear 22' is mounted on the carrier body 20'. The carrier cover 21' and the carrier body 20' are connected by a fastener. In the present embodiment, the fastener may be a first bolt 30'. The carrier body 20' is provided with at least one support arm 200' protruding therefrom. Each support arm 200' is provided with a positioning post 201' protruding from a surface of the support arm 200', and further defines a screw hole 202' on the surface of the support arm 200'. The carrier cover defines a positioning hole 211' and a through hole 210'. The first bolt 30' passes through the through hole 210' of the carrier cover 21' and is locked and fixed in the screw hole 202' of the support arm 200'. Alternatively, in another example, the fastener may be a column. The planetary carrier is provided with at least one support arm protruding therefrom. Each support arm is provided with a positioning post protruding from a surface of the support arm, and further defines a receiving hole (not shown) on the surface of the support arm. The carrier cover defines a positioning hole and a through hole. The column passes through the through hole of the carrier cover, and has one end received in the receiving hole of the support arm and one other end fixed to the carrier cover by welding or the like. Alternatively, a boss (not shown) may be provided on a periphery of the through hole of the carrier cover. After the column passes through the through hole of the carrier cover and is received in the receiving hole of the support arm, an edge of the boss is deformed towards the column to fix the column.

In an example, one end of the follower shaft 25' protrudes from the sun gear 23' and is rotatably connected to the carrier body 20'. In an example, the output shaft 11' is disposed at one end of the carrier body 20'. The carrier body 20' is provided with a recess 203' recessed from an inner surface of carrier body 20'. A bearing 31' is provided within the recess 203'. The end of the adapter shaft 25' protruding from the sun gear 23' is connected to the bearing 31'. In an example, the carrier body 20' defines a through hole 204', one end of the output shaft 11' is inserted into the through hole 24' from one end of the through hole 204' and fixed therein (e.g., by splines or the like). The recess 203' is provided at one other end of the through hole 204' and is disposed coaxially with the through hole 204'. Alternatively, the carrier body 20' and the output shaft 11' may be integrally formed.

The adapter shaft 25' and the input shaft 10' are connected by a structure including a cross spline and a cross key groove. For example, one other end of the adapter shaft 25' is provided with a cross spline, and the input shaft 10' defines a cross key groove. A retaining sleeve 26' is provided at a periphery of a connection between the adapter shaft 25' and the input shaft 10'. By means of the splines and the key grooves structure, errors of the output shaft assembly in both an axial direction and a radial direction can be compensated within a small amplitude range, so that the input shaft and the output shaft are precisely coaxial with each other. Alternatively, the adapter shaft 25' may be connected with the input shaft 10' in a clearance fit, or by using a coupling.

In an example, the transmission device further includes an outer gear ring 13' and an output shaft cover 12'. The outer gear ring 13' is disposed inside the output shaft cover 12' and engages with the planetary gear 22'. The output shaft cover 12' is connected to an output shaft sleeve 14'. In an example, the outer gear ring 13' and the output shaft cover 12' are integrally formed. Alternatively, in another example, as shown in the figures, the outer gear ring 13' is provided with a projection 130', and the output shaft cover 12' defines a snap groove 120' at an inner surface thereof. The projection 130' and the snap groove 120' are engaged to fix the outer gear ring 13' to the output shaft cover 12'. Further, a groove 121' is defined at an inner edge of the output shaft cover 12', and a sealing ring 32' is provided within the groove 121'.

In an example, the transmission device further includes a drive shaft cover 27' in which the drive shaft 10' is received. A bearing 28' is further provided on a periphery of the drive shaft 10'. Further, the input shaft cover 27' and the output shaft cover 12' are connected and fixed by a fastener. In an example, the fastener may be a second bolt 33'. Correspondingly, the input shaft cover 27' and the output shaft cover 12' each defines a screw hole 270', 122', through which the second bolt 33' passes and fixes the input shaft cover 27' to the output shaft cover 12', and the sealing ring 32' is fixed between the input shaft cover 27' and the output shaft cover 12' to prevent leakage of lubricating oil added to the planetary gear train. In an example, the aforementioned fastener is not limited to a bolt, but may be similar to the connection between the planet cover 21' and the planet carrier body 20'.

In an example, the adapter shaft 25' may be directly connected to a motor (not shown), without requiring the cross spline and the key groove discussed above.

The working principle of the planetary gear train described above and the functions of bearings, C-rings, gaskets and seals in the drawings are described in detail in Chinese Patent Application No. 201020278812.X and Chinese Patent Application No. 20132048680.3, and will not be described in detail herein.

In the present disclosure, since the planetary carrier is provided with the first bearing and the second bearing which are coaxially disposed with the output shaft, and the other end of the follower shaft is connected with the drive shaft in a clearance fit, it is possible to avoid the radial swing of the output shaft. Meanwhile, the planetary carrier, the planetary gear train, the output shaft and the adapter shaft are all arranged in the output shaft assembly, and the end of the adapter shaft protrudes from the sun gear and is rotationally connected with the planetary carrier, thereby facilitating control of the coaxiality between the sun gear and the output shaft without requiring improvement of dimensional accuracy of other elements for this purpose, and thus effectively solving the problem that the coaxiality of the input shaft and the output shaft cannot be guaranteed.

Those skilled in the art should appreciate that the aforementioned embodiments are specific embodiments for implementing the present disclosure. In practice, however, various changes may be made in the forms and details of the specific embodiments without departing from the spirit and scope of the present disclosure.

What is claimed is:

1. A transmission device for a household electrical appliance, comprising an output shaft assembly, wherein the output shaft assembly comprises a planetary carrier, a planetary gear train mounted on the planetary carrier, an output shaft, and an adapter shaft;

wherein the planetary gear train comprises a sun gear and at least one planetary gear that are engaged with each other in sequence, the planetary carrier is connected to the output shaft, the sun gear is connected to the adapter shaft, and one end of the adapter shaft protrudes from the sun gear and is rotatably connected to the planetary carrier;

wherein the output shaft is disposed at one end of the carrier body, the carrier body is provided with a recess recessed from an inner surface of the carrier body, a bearing is provided within the recess, and the end of the adapter shaft protruding from the sun gear is connected to the bearing; and wherein the planetary carrier is provided with a through hole, one end of the output shaft is inserted into the through hole from one end of the through hole and fixed therein, and the recess is provided at another end of the through hole and is disposed coaxially with the through hole.

2. The transmission device according to claim 1, wherein the planetary carrier comprises a carrier body and a carrier cover, the planetary gear is mounted on the carrier body, and the carrier cover is fixed to the carrier body.

3. The transmission device according to claim 1, further comprising an input shaft connected to the adapter shaft.

\* \* \* \* \*